US012656879B2

(12) United States Patent
Boydston et al.

(10) Patent No.: US 12,656,879 B2
(45) Date of Patent: Jun. 16, 2026

(54) LEVERAGING MACHINE LEARNING AND FRACTAL ANALYSIS FOR CLASSIFYING MOTION

(71) Applicant: PROJECT DASEIN LLC, Redmond, OR (US)

(72) Inventors: Cooper Ray Boydston, Redmond, OR (US); Sean Michael Roach, Terrebonne, OR (US); Richard Philip Taylor, Eugene, OR (US); Conor Rowland, Bend, OR (US)

( * ) Notice: Subject to any disclaimer, the term of this patent is extended or adjusted under 35 U.S.C. 154(b) by 10 days.

(21) Appl. No.: 18/734,137

(22) Filed: Jun. 5, 2024

(65) Prior Publication Data

US 2024/0361842 A1      Oct. 31, 2024

Related U.S. Application Data

(63) Continuation-in-part of application No. 18/225,308, filed on Jul. 24, 2023, now abandoned, which is a continuation of application No. 16/837,188, filed on Apr. 1, 2020, now Pat. No. 11,733,781.

(60) Provisional application No. 62/828,152, filed on Apr. 2, 2019.

(51) Int. Cl.
| | |
|---|---|
| *G06T 7/20* | (2017.01) |
| *G01B 11/25* | (2006.01) |
| *G06F 3/01* | (2006.01) |
| *G06N 20/00* | (2019.01) |

(52) U.S. Cl.
CPC .............. *G06F 3/017* (2013.01); *G01B 11/25* (2013.01); *G06F 3/011* (2013.01); *G06N 20/00* (2019.01); *G06T 7/20* (2013.01); *G06F 2203/011* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 5,859,919 A * | 1/1999 | Holland | .................... | G06T 7/48 |
| | | | | 382/152 |
| 5,870,493 A * | 2/1999 | Vogl | ..................... | G06V 10/454 |
| | | | | 382/295 |
| 7,942,833 B2 * | 5/2011 | Yasuhara | ............... | B25J 9/0006 |
| | | | | 600/595 |
| 11,733,781 B2 * | 8/2023 | Boydston | ............... | G01B 11/25 |
| | | | | 715/863 |
| 12,164,680 B1 * | 12/2024 | Brayman | ................ | G06F 3/011 |
| 2002/0116990 A1 * | 8/2002 | Claussen | .............. | A61B 5/1122 |
| | | | | 73/65.01 |
| 2004/0161161 A1 * | 8/2004 | Recht | ..................... | G06V 10/28 |
| | | | | 382/257 |
| 2005/0113703 A1 * | 5/2005 | Farringdon | .......... | A61B 5/0245 |
| | | | | 600/509 |
| 2009/0062628 A1 * | 3/2009 | Yamamoto | ........... | A61B 5/1135 |
| | | | | 600/534 |
| 2009/0292180 A1 * | 11/2009 | Mirow | .................. | G16H 10/20 |
| | | | | 600/300 |

(Continued)

*Primary Examiner* — Daniel Rodriguez

(57) ABSTRACT

A machine learning process for classifying human or animal motion, including the classification of repetitive movements of a human or an animal in order to assess the quality of athletic performance, artistic performance, form, or other quality of motion. The classification of the repetitive movements, in particular, provide an indication of movement dysfunctions.

10 Claims, 10 Drawing Sheets

(56) References Cited

U.S. PATENT DOCUMENTS

| | | | | |
|---|---|---|---|---|
| 2011/0065488 A1* | 3/2011 | Okamura | ............. | A63F 13/428 |
| | | | | 463/43 |
| 2012/0029888 A1* | 2/2012 | Horng | ...................... | B24C 1/04 |
| | | | | 703/2 |
| 2012/0065524 A1* | 3/2012 | Morren | ............... | A61B 5/1102 |
| | | | | 73/514.01 |
| 2012/0245439 A1* | 9/2012 | Andre | ................. | A61B 5/0022 |
| | | | | 600/595 |
| 2015/0196403 A1* | 7/2015 | Kim | ......................... | A61F 2/70 |
| | | | | 623/24 |
| 2017/0188894 A1* | 7/2017 | Chang | ................. | A61B 5/1121 |
| 2018/0070863 A1* | 3/2018 | Matsumura | ......... | A61B 5/1127 |
| 2018/0220937 A1* | 8/2018 | Mizuochi | ............... | A61B 5/112 |
| 2018/0239434 A1* | 8/2018 | Lu | ........................... | G06F 3/017 |
| 2020/0170515 A1* | 6/2020 | Wen | ..................... | A61B 5/7275 |
| 2020/0375501 A1* | 12/2020 | Motamedi | ............. | A61B 5/112 |
| 2021/0397957 A1* | 12/2021 | Vaishampayan | ....... | G06N 3/084 |
| 2022/0031241 A1* | 2/2022 | Li | ............................ | A43B 3/48 |
| 2022/0142850 A1* | 5/2022 | Ahn | ....................... | G16H 20/30 |
| 2022/0183440 A1* | 6/2022 | Znamenskiy | ......... | A45D 27/00 |

* cited by examiner

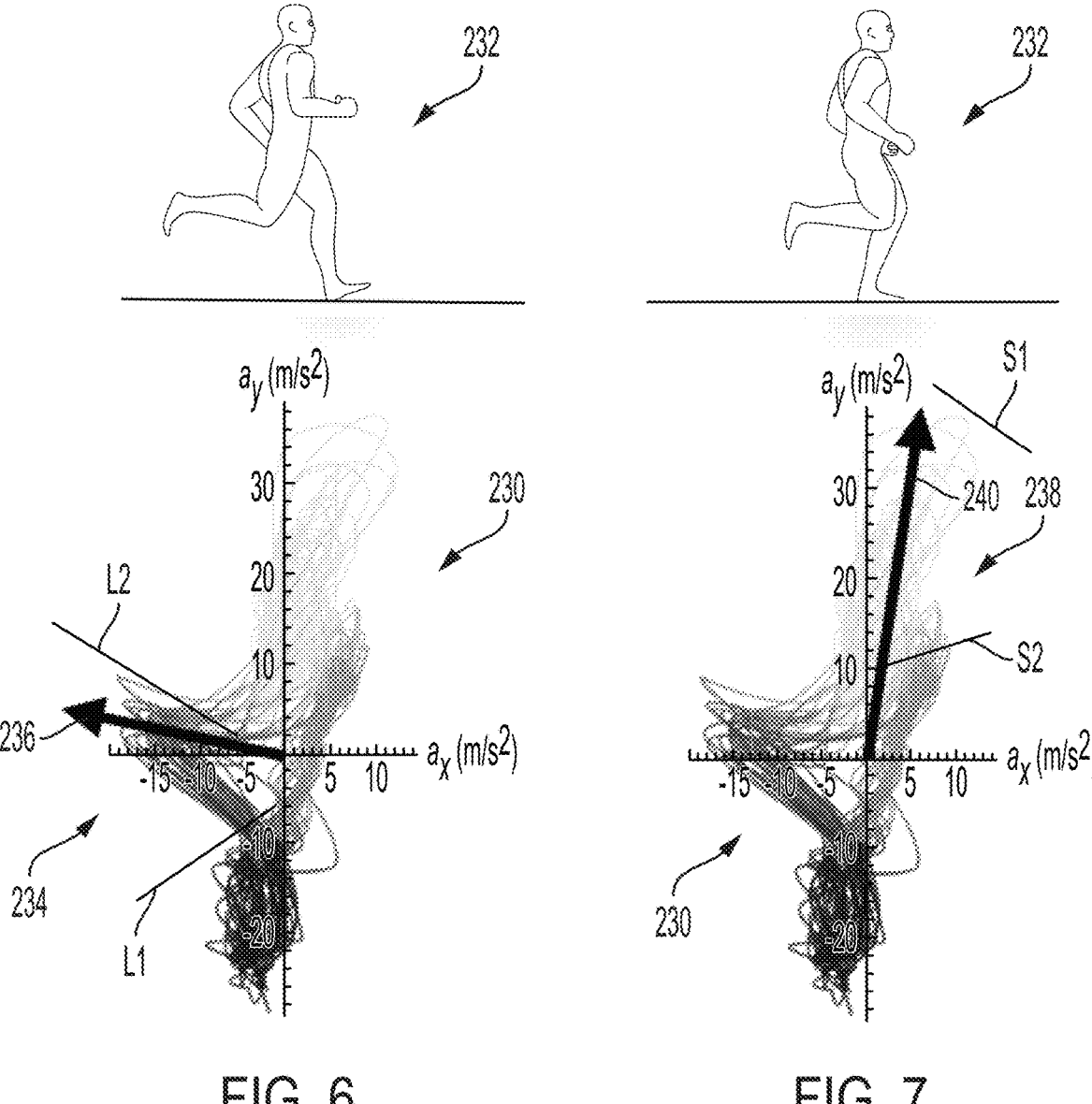
FIG. 6                    FIG. 7

LEVERAGING MACHINE LEARNING AND FRACTAL ANALYSIS FOR CLASSIFYING MOTION

CROSS-REFERENCE TO RELATED APPLICATIONS

This application is a continuation in part of U.S. patent application Ser. No. 18/225,308, which is a continuation of U.S. patent application Ser. No. 16/837,188 filed on Apr. 1, 2020; and issued as U.S. Pat. No. 11,733,7891 on Aug. 22, 2023, which claims the benefit of U.S. Provisional Application Ser. No. 62/828,152 filed on Apr. 2, 2019, the contents of which are all expressly incorporated herein by reference in their entirety.

BACKGROUND

The statements in this background section merely provide background information related to the present disclosure and should not be construed as constituting prior art.

Authenticating abstract drip painting as being authentic paintings of the original master artist is a challenge due to the nature of the pieces. To create an artwork in this style, a canvas is placed on the floor, and the artist allows paint to drip down from the brush to the canvas. As the artist moves over the canvas, paint is dropped from the brush creating a trace of the movement patterns made by the painter.

Additionally, every individual's body has a set of bio-mechanical motion variations (bio-variations), or natural motions, which interact at multiple scales to drive many forms of activity from dance to the creation of art. These bio-variations exhibit subtle variations from individual to individual (e.g., elite athletes vs. casual joggers, famous artists vs crude imitators, etc.), but also within individuals when their condition changes (e.g., from fatigue, physical injury, psychological, physiological or neurological conditions, age, concentration, etc.).

One bio-variation pattern of particular interest is the identification of fatigue in running. In particular, running related injuries are very common, and it is believed that a major cause of such injuries is due to the breakdown of running form once the runner becomes fatigued. To this end, it is also suspected that many running related injuries are also caused by poor running form in response to muscle weakness or poor motor control patterns.

In a physical therapy clinic, a therapist works with a patient to guide exercises and ensure that the patient is performing the movements with proper form. Patients who are not familiar with the exercises are often hesitant to practice on their own for fear of injury, or may accidentally injure themselves by performing the exercise improperly.

The technologies described herein are intended to address and/or to improve upon some of the above-mentioned issues and challenges within the relevant industry.

SUMMARY

The technologies described herein are concerned, for example, with assessing the quality of movement patterns, whether artistic, athletic, or otherwise. Although conventional systems may record the quantity of movement, such as the number of steps taken, distance traveled, or number of repetitions executed, or may provide feedback concerning a limited number of key measurements, such systems do not assess the quality of the entire pattern. To accomplish this, the technologies described herein incorporate fractal analysis techniques (e.g., in conjunction with machine learning techniques) in the quantification of human or animal movement patterns.

Moreover, although conventional systems may be capable of presenting a time series graph of measurements (e.g., acceleration vs. time), such systems are incapable of generating an aesthetic orbital diagram that allows the pattern to be viewed in a more intuitive manner by the user. More particularly, the technologies described herein allow the creation of a 2D projection of motion, which in turn allows for the use of quicker, more reliable, and more advanced machine vision algorithms.

The technologies described herein may also involve a calibration procedure that may be used as a baseline when detecting running fatigue in a unique manner as described herein. More particularly, the technologies described herein may utilize a calibration procedure that trains a machine learning algorithm to assess movement quality with the assistance of a skilled observer. After the movement quality has been assessed, the system records the captured movement observations within a database that includes patterns of individuals who have been assessed by a qualified third party, such as, for instance, a licensed physical therapist, a health care practitioner or a coach. This data can then be used to train a machine learning algorithm to classify various movement patterns.

In some embodiments, the technologies described herein include the collection of movement and/or bio-variation data from users performing various activities, and a unique gestural art visualization may be created based on such data. The created visualization, in turn, highlights the subtle variations in the movement pattern, which can then be further analyzed and categorized, for example, using fractal analysis and machine learning algorithms.

In some embodiments, the technologies described herein may further provide a method for determining when a runner's form begins to exhibit movement patterns associated with fatigue. Further, the detected variations in movement pattern may be relayed to the runner as a means to recommend when the user should take a break and rest in order to avoid potential injury. Moreover, in some embodiments, the detected movement pattern variations of the runner may also be compared with clinically diagnosed individuals exhibiting similar dysfunctions in an effort to further diagnose improper form, and thus provide additional corrective feedback.

It should be appreciated that, in some embodiments, a diagnostic tool utilizing movement sensors may be available to physical therapists, trainers, and coaches for the purpose of training a user in conjunction with a machine learning algorithm. For example, after the system has been trained to identify proper form in exercise (with guidance from a physical therapist or coach), the user can use the system independently and receive feedback based on the quality of the user's movements. This may allow the patient to exercise outside of the clinic with a reduced likelihood of injury due to improper form. Additionally, in some embodiments, the system can count sets and repetitions performed by the user, thereby allowing both patient and therapist to comply with an exercise program.

In some embodiments, the technologies described herein may provide for analyzing movement patterns (e.g., other than running or physical therapy) for a variety of exercises in which improper movements may lead to injury or where feedback regarding movement quality may lead to improved performance. For example, the technologies described herein may be used in conjunction with weight lifting, baseball pitching, golf swinging, martial arts, dancing, and/ or other movements/activities.

In some embodiments, the technologies described herein provide for analyzing the movement patterns of patients suffering from neurodegenerative diseases, such as Parkinson's disease, Alzheimer's disease, Huntington's disease, ALS, and/or other conditions. It has been shown that exercise can be beneficial in the treatment of many neurodegenerative diseases; however, there is an increased risk of injury due to falling or poor movement mechanics. Accordingly, the technologies described herein may be used to monitor movement patterns and provide feedback for these patients as a means to minimize the risk of injury.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

In one embodiment, there is provided a method including: sensing sensor data generated by one or more inertial sensors, the sensor data being caused by movement of a user, and the sensor data comprising acceleration data in multiple dimensions; recording the sensor data with a wearable computing system configured to be worn by the user; projecting, by the wearable computing system, a three-dimensional acceleration pattern indicated by the acceleration data to a two-dimensional plane to generate a two-dimensional acceleration projection having a first acceleration dimension and a second acceleration dimension, where the first acceleration dimension is orthogonal to the second acceleration dimension and both the first and second acceleration dimensions have units of distance per second squared; analyzing the two-dimensional acceleration projection using machine learning to identify a movement function, including a proper movement or a movement dysfunction; and providing to the user, by the wearable computing system, visual feedback regarding the user movement based on the analyzed two-dimensional acceleration projection; wherein the visual feedback includes a two-dimensional orbital image showing an orbital pattern having one or more indicators.

In some embodiments, the method includes wherein the two-dimensional orbital image includes a plurality of orbital cycles and the user movement includes a plurality of repetitive user movement cycles where in each orbital cycle of the plurality of orbital cycles representing an individual movement cycle of the plurality of repetitive user movement cycles.

In some embodiments, the method includes wherein each orbital cycle represents a repetitive body motion of a user having a start location and stop location of the user's body.

In some embodiments, the method includes wherein the indicators of the orbital pattern identify one or more phases of the orbital pattern of the user in the first and second acceleration dimensions, wherein the phases are identified based on a plurality of orbital cycles.

In some embodiments, the method includes wherein the indicators of the orbital pattern include one or more phases of a landing phase, a stabilizing phase, a launching phase, or a flying phase.

In some embodiments, the method includes wherein the one or more phases each include different indicators to identify a different phase of the one or more phases.

In some embodiments, the method includes wherein the different indicators include one of a plurality of colors, or one of a plurality of grayscales, or a combination thereof.

In some embodiments, the method includes wherein the two-dimensional projection includes a plurality of orbital cycles and the analyzing of the two-dimensional acceleration projection includes determining an average of the plurality of orbital cycles.

In some embodiments, the method includes wherein the two-dimensional orbital image includes a single curve representing an average of the plurality of orbital cycles.

In some embodiments, the method includes wherein the single curve includes a different indicator to identify each one of one or more phases of the single curve, wherein the phases include at least one of a landing phase, a stabilizing phase, a launching phase, or a flying phase.

In some embodiments, the method includes wherein the two-dimensional projection includes a plurality of orbital cycles and the analyzing of the two-dimensional acceleration projection includes determining an overlap condition of the plurality of orbital cycles.

In some embodiments, the method includes wherein the one or more indicators of the two-dimensional orbital image showing the orbital pattern includes a color value or a grayscale value that is incremented when any orbital cycle overlaps.

In some embodiments, the method includes wherein the two-dimensional projection includes a plurality of orbital cycles and the analyzing the two-dimensional acceleration projection includes determining an user's left side versus right side.

In some embodiments, the method includes wherein the one or more indicators of the two-dimensional orbital image showing the orbital pattern includes a first color value or a first grayscale value showing the left side and a second color value or a second grayscale value showing the right side.

In another embodiment, there is provided a wearable computing device configured to be worn by a user. The wearable computing device includes one or more inertial sensors configured to generate sensor data based on movement of the user, wherein the sensor data includes acceleration data in multiple dimensions. The wearable computing device includes at least one processor configured to: receive the sensor data generated by the one or more inertial sensors; project a three-dimensional acceleration pattern indicated by the acceleration data to a two-dimensional plane to generate a two-dimensional acceleration projection that has a first acceleration dimension and a second acceleration dimension, where the first acceleration dimension is orthogonal to the second acceleration dimension and both the first and second acceleration dimensions have units of distance per second squared; analyzing the two-dimensional acceleration projection using machine learning to identify a movement function, including a proper movement or a movement dysfunction; provide visual feedback of the user movement based on the analyzed two-dimensional acceleration projection; wherein the visual feedback includes a two-dimensional orbital image showing an orbital pattern having one or more indicators.

In some embodiments, the wearable computing device includes wherein the two-dimensional orbital image includes a plurality of orbital cycles and the user movement includes a plurality of repetitive user movement cycles; wherein each orbital cycle of the plurality of orbital cycles represents an individual movement cycle of the plurality of repetitive user movement cycles.

In some embodiments, the wearable computing device includes wherein each orbital cycle represents a repetitive body motion of a user having a start location and stop location of the user's body.

In some embodiments, the wearable computing device includes wherein the indicators of the orbital pattern identify one or more phases of the orbital pattern of the user in the first and second acceleration dimensions.

In some embodiments, the wearable computing device includes a transmitter configured to transmit the at least one two-dimensional acceleration projection to a remote computing device for analysis.

In a further embodiment, there is provided a method including: transmitting sensor data generated by an inertial sensor, wherein the sensor data being is by movement of a user moving through a plurality of movement cycles, and the sensor data includes acceleration data in multiple dimensions; recording the sensor data with a wearable computing system configured to be worn by the user; projecting, by the wearable computing system, a three-dimensional acceleration pattern indicated by the acceleration data to a two-dimensional plane to generate at least one two-dimensional acceleration projection having a first acceleration dimension and a second acceleration dimension, where the first acceleration dimension is orthogonal to the second acceleration dimension; analyzing the at least one two-dimensional acceleration projection using machine learning to identify a movement dysfunction; and providing to the user, by the wearable computing system, visual feedback regarding the user movement based on the at least one two-dimensional acceleration projection; wherein the visual feedback includes at least one two-dimensional orbital image showing an orbital pattern having one or more indicators.

In some embodiments, the method includes wherein the at least one two-dimensional orbital image includes a plurality of orbital cycles, wherein the plurality of orbital cycles are overlaid to indicate phases of user movements that occur in each orbital cycle.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 6 depicts a plurality of orbital cycles of a runner including a first phase.

FIG. 7 depicts a plurality of orbital cycles of a runner including a second phase

DETAILED DESCRIPTION

Figure 1:
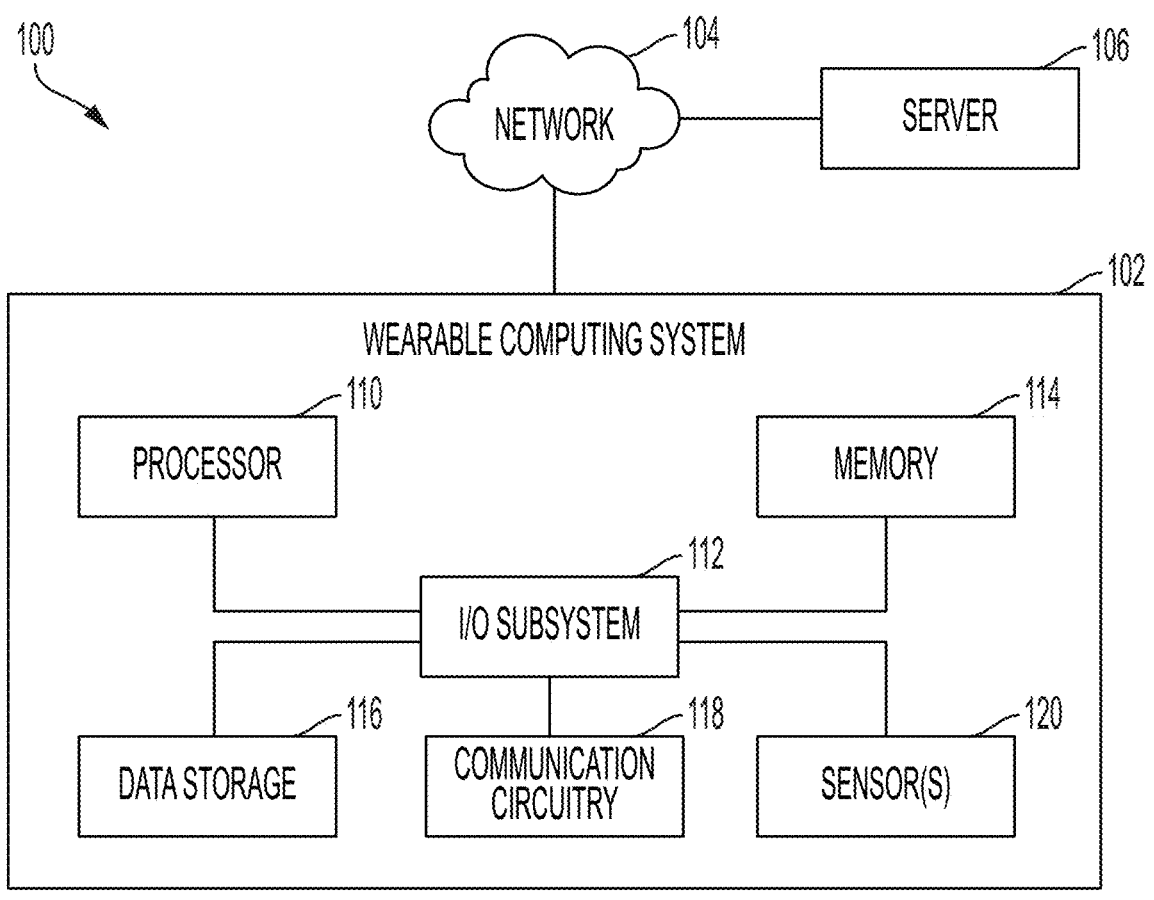
FIG. 1 is a simplified block diagram of at least one embodiment of a system for leveraging machine learning and/or fractal analysis to classify motion.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

As described in greater detail below, the technologies described herein allow for the collection of bio-variation data from users performing various activities. To do so, input data may be gathered from a variety of sources including, but not limited to, paint traces of human or animal movement, inertial sensors (e.g., an IMU) relaying acceleration or orientation data, video, still images showing movement traces, and other data. In some embodiments, a method of analysis described herein involves a still image showing the trajectory of a repetitive movement pattern. For instance, inertial sensor data can be recorded and processed by projecting a three-dimensional movement pattern into a two-dimensional plane. Such a projection may essentially be a digital version of dropped paint onto a canvas that has been analyzed for a resulting pattern. If data is recorded in higher dimensions, it may first be projected to a two-dimensional trace prior to analysis (e.g., (x,y,z) (x,y), (x,z), (y,z)). Data points may then joined with a line or curve in order to create a two-dimensional image that can be inputted into the machine learning process. Instead of performing a traditional time series analysis of the motion sample, two-dimensional images may be created from each plane (e.g., side, front, top) and may be analyzed as a static image similar to an abstract drip painting. It should be appreciated that conversion to a two-dimensional image allows for the use of highly efficient and optimized machine vision algorithms. Additionally, a visually aesthetic image may be created by overlaying multiple repetitions of the movement pattern in question, and this image can be presented to the user for intuitive feedback. It should be appreciated that the various motions can be displayed in x, y, z space to generate a "spatial portrait" of the individual or displayed in acceleration space (ax, ay, az) to generate a "force portrait" of the individual. In other words, the various projections described herein may be made from higher dimensional data sets in positional space, acceleration space, and/or other suitable spaces. For example, in some embodiments, the projections may be from momentum space, velocity space, and/or other spaces. Further, it should be appreciated that the higher dimensional data sets from which the projections are made may be associated with non-inertial sensor data in other embodiments. Depending on the particular embodiment, the various "portraits" or projections may be used separately or together to capture the individual's unique motions. In some embodiments, data can also be sampled and transmitted to a mobile device, computer, or cloud for further analysis and feedback.

In embodiments in which data is acquired via inertial sensors, the sensors may be first placed in specific locations on the user's body. In some embodiments, the sampling rates for data acquisition may be approximately 1 kHz; however, it should be appreciated that the sampling rates may vary in other embodiments. Similarly, accelerometer sensitivity may also vary, for example, depending on the sensor placement or specific application. It should be appreciated that various different communication technologies may be utilized depending on the particular embodiment including, for example, wireless transmission to a remote device (e.g., a mobile device or computer) via Bluetooth, Wi-Fi, or communication technology. In addition, in some embodiments, data may be recorded directly to the sensor device (and/or another computing device) to be processed and analyzed at a later time. Moreover, depending on the particular embodiment, sensors may transmit data individually, or multiple sensors may be wired together and all sensor data may be transmitted from a single transmitter.

As described herein, after the data has been acquired and processed, it may be classified using a combination of machine learning and fractal analysis techniques. For example, in some embodiments, the various movement patterns of the user may be classified using such techniques. Further, in some embodiments, in addition to machine learning classification and fractal analysis of the movement patterns, an aesthetic image of the repetitive movement trajectory may also be generated from the inertial sensor data. In some embodiments, the generated image may be presented to the user as feedback and/or to track progress over time by either demonstrating improvement with practice or reduction of movement quality with fatigue. Images may also be shared with coaches, physical therapists, trainers, and/or other users.

It should be understood and appreciated herein that the technologies described herein have several features that are advantageous, particularly when compared to other processes known within the art. For example, in some embodiments, the technologies described herein make use of advanced machine vision algorithms by analyzing a two-dimensional projection of higher dimensional orbit as opposed to traditional time series analysis. Such a technique is particularly useful because machine vision algorithms developed mainly for use in other fields are very fast and accurate. Unlike conventional systems that require video for such machine learning techniques, the techniques described herein allow for the use of inertial sensors, paint, and/or other measurement devices.

In some embodiments, the technologies described herein may be leverages to measure fatigue in running specific to the individual being monitored. Other systems, by contrast, use a broad "one size fits all" assessment of biomechanics. Further, in other embodiments, the technologies described herein allow for the calibration of exercise routines to be guided by a physical therapist or experienced coach. This is particularly useful because the associated exercises are guided and individualized, and the machine learning algorithm may be thereby trained as the user is trained by the skilled observer. Other examples and embodiments are further described in detail below.

Referring now to FIG. 1, in the illustrative embodiment, a system 100 for leveraging machine learning and/or fractal analysis to classify motion includes a wearable computing system 102, a network 104, and a server 106. The wearable computing system 102 may be embodied as any type of computing device capable of being worn by a user (e.g., a smart watch, sensor assembly, cellular phone, smartphone, etc.). In other embodiments, it should be appreciated that the wearable computing system 102 may instead be embodied as one or more separate (i.e., non-worn) devices communicatively coupled to one or more sensors (e.g., worn by a user). As such, in various embodiments, it should be appreciated that the wearable computing system 102 may be embodied as and/or include a wearable computing device, a desktop computer, laptop computer, tablet computer, notebook, netbook, Ultrabook™, cellular phone, smartphone, personal digital assistant, mobile Internet device, Internet of Things (IoT) device, server, router, switch, and/or any other computing/communication device capable of performing the functions described herein.

As shown in FIG. 1, the illustrative wearable computing system 102 includes a processor 110, an input/output ("1/0") subsystem 112, a memory 114, data storage 116, a communication circuitry 118, and one or more sensors 120. Of course, the wearable computing system 102 may include other or additional components, such as those commonly found in a typical computing device/system (e.g., various input/output devices and/or other components), in other embodiments. Additionally, in some embodiments, one or more of the illustrative components, or a portion thereof, may be incorporated in the processor 110 in some embodiments. Although a single wearable computing system 102 is illustratively shown, it should be appreciated that one or more of the components of the wearable computing system 102 described herein may be distributed across multiple computing devices. In other words, the techniques described herein may be employed by a computing system that includes one or more computing devices.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the wearable computing system 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the wearable computing system 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the wearable computing system 102, on a single integrated circuit chip. For example, in some embodiments, one or more of the components of the wearable computing system 102 may form one or more application-specific integrated circuits (ASICs).

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the wearable computing system 102 useful for performing the functions described herein.

The communication circuitry 118 may be embodied as any communication circuit, device, or collection thereof, capable of enabling communications between the wearable computing system 102 and other remote devices (e.g., the server 106) over a network (e.g., the network 104). The communication circuitry 118 may be configured to use any one or more communication technologies (e.g., wireless or wired communications) and associated protocols (e.g., Ethernet, Bluetooth®, Wi-Fi®, WiMAX, etc.) to bring about such communication.

Each of the sensors 120 is configured to generate sensor data (e.g., by virtue of one or more signals), which may be interpreted by the processor 110 to determine one or more characteristics associated with the environment thereof. By way of example, the sensors 120 may detect various physical characteristics, electrical characteristics, and/or electromagnetic characteristics of its environment. For example, in the illustrative embodiment, one or more of the sensors 120 may be embodied as, or otherwise include, at least one inertial sensor (e.g., accelerometer, gyroscope, etc.). In other embodiments, the sensors 120 may include one or more other inertial sensors, environmental sensors, proximity sensors, optical sensors, electromagnetic sensors (e.g., magnetometers), audio sensors, motion sensors, piezoelectric sensors, cameras, and/or other types of sensors. Further, the wearable computing system 102 may also include components and/or devices configured to facilitate the use of the sensors 120. In some embodiments, it should be appreciated that multiple sensors 120 may be included in a single sensor module (e.g., an inertial measurement unit).

Although the sensors 120 are depicted as forming a portion of the wearable computing system 102 in FIG. 1, it should be appreciated that one or more of the sensors 120 may be separate from the wearable computing system 102 in some embodiments. Further, in such embodiments, the sensors 120 may be communicatively coupled to the wearable computing system 102 via a suitable wired or wireless communication connection. In some embodiments, each of such distributed sensors 120 may be configured to communicate directly with the wearable computing system 102, whereas in other embodiments the distributed sensors 120 may include an aggregating sensor 120 configured to collect the sensor data generated by one or more other distributed sensors 120 for transmission to the wearable computing system 102 (e.g., via a single communication path).

Further, in some embodiments, the wearable computing system 102 may be configured to be coupled to one or more peripheral devices. It should be appreciated that the particular peripheral devices may include any number of additional peripheral or interface devices, such as speakers, microphones, additional storage devices, and so forth, and may depend on, for example, the type and/or intended use of the wearable computing system 102. For example, in some embodiments, the peripheral devices may include a keyboard, mouse, display, touchscreen display, printer, alarm, status indicator, handheld device, diagnostic tool, and/or one or more other suitable peripheral devices.

The network 104 may be embodied as any type of communication network capable of facilitating communication between the wearable computing system 102 and remote devices (e.g., the server 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), ad hoc networks, short-range communication links, or a combination thereof.

The server 106 may be embodied as any type of computing device capable of performing the functions described herein. For example, the server 106 may be embodied as a server, desktop computer, laptop computer, tablet computer, notebook, netbook, Ultrabook™ cellular phone, smartphone, wearable computing device, personal digital assistant, mobile Internet device, Internet of Things (IoT) device, router, switch, and/or any other computing/communication device capable of performing the functions described herein. In some embodiments, the server 106 may include components similar to the components of the wearable computing system 102 described above and, therefore, the descriptions of those components have not been repeated herein for clarity of the description. Further, it should be appreciated that the server 106 may include other components, subcomponents, and/or devices commonly found in a computing device, which are not discussed herein for clarity of the description. Additionally, in some embodiments, one or more of the components of the wearable computing system 102 may be omitted from the server 106 (e.g., the sensors 120).

Although only one wearable computing system 102, one network 104, and one server 106 are shown in the illustrative embodiment of FIG. 1, the system 100 may include multiple wearable computing systems 102, networks 104, and/or servers 106 in other embodiments. For example, in some embodiments, the server 106 may communicate with multiple wearable computing systems 102. Further, in some embodiments, it should be appreciated that the wearable computing system 102 may perform all of the functions described herein (e.g., the functions of both the wearable computing system 102 and the server 106). In such embodiments, the network 104 and the server 106 may be omitted from the system 100.

It should be further appreciated that, although the server 106 is described herein as a device and/or system outside of a cloud computing environment, in other embodiments, the server 106 may be embodied as or include a cloud-based device or collection of devices within a cloud computing environment. Further, in cloud-based embodiments, the server 106 may be embodied as a server-ambiguous computing solution, for example, that executes a plurality of instructions on-demand, contains logic to execute instructions only when prompted by a particular activity/trigger, and does not consume computing resources when not in use. That is, the server 106 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the server 106 described herein. For example, when an event occurs (e.g., data is transferred to the processor for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of certain data is made (e.g., via an appropriate user interface to the server 106), the appropriate virtual function(s) may be executed to perform the actions before eliminating the instance of the virtual function(s).

Figure 2:
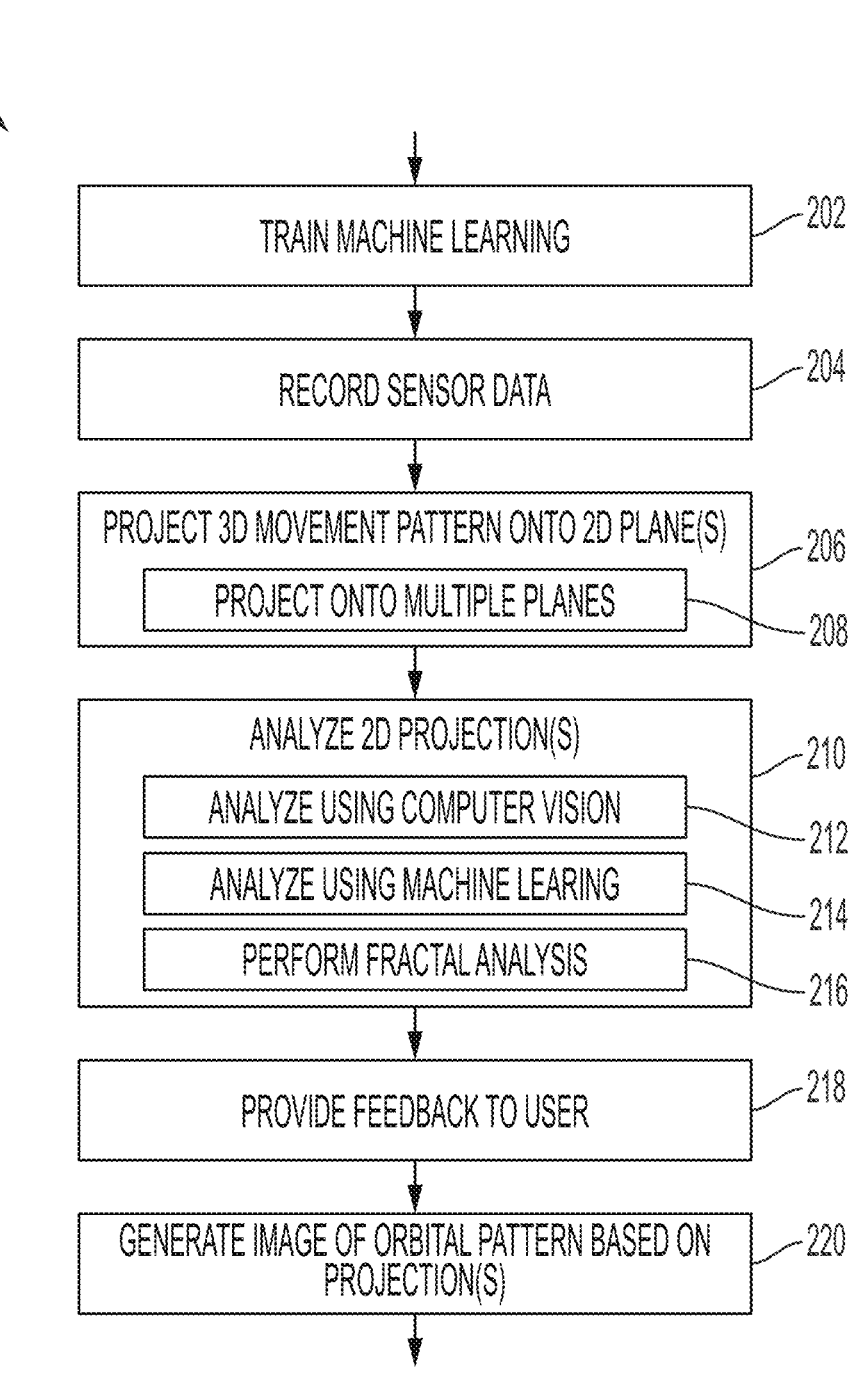
FIG. 2 is a simplified flow diagram of at least one embodiment of a method for leveraging machine learning and/or fractal analysis to classify motion using the system of FIG. 1.
Figure 3:
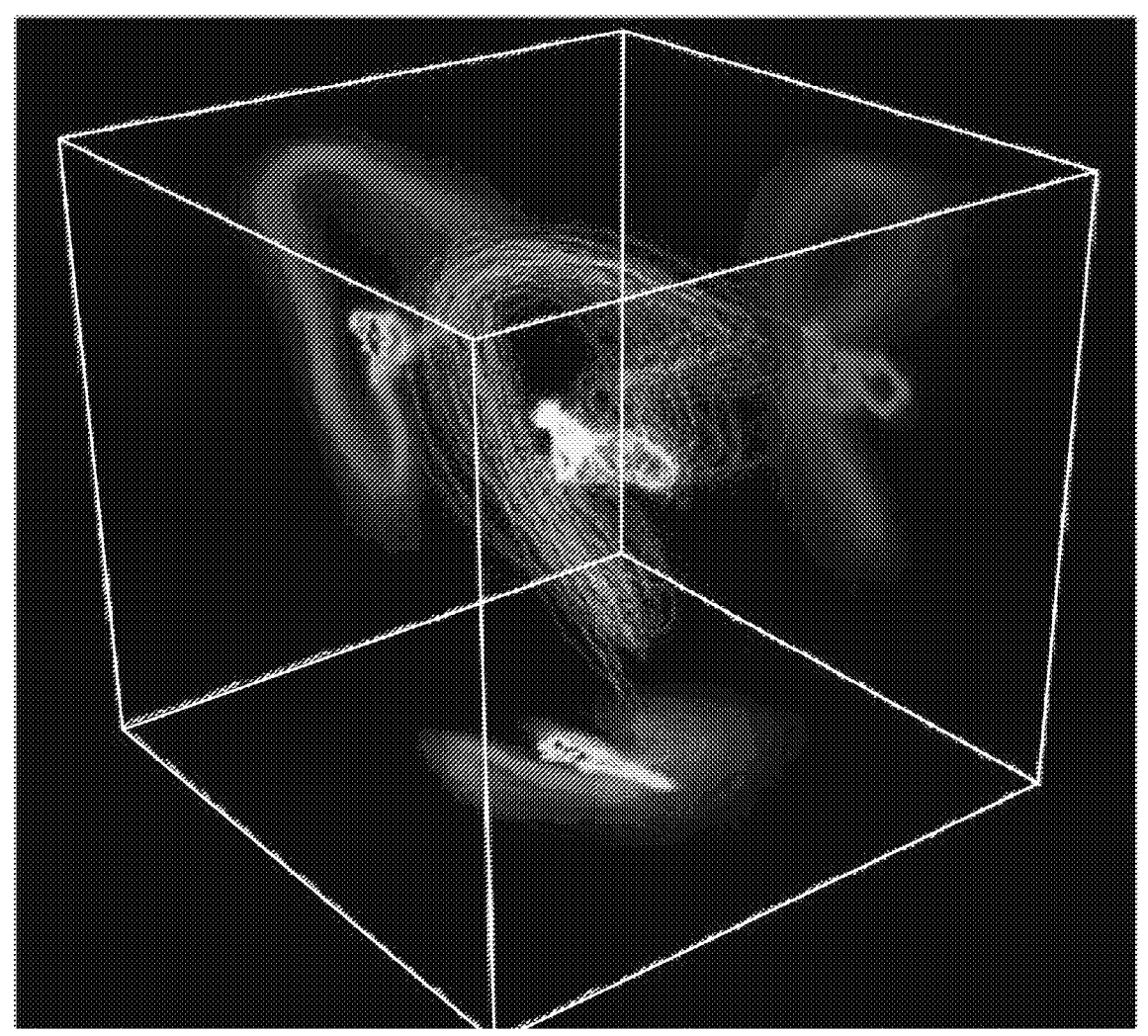
FIG. 3 depicts the projection of three-dimensional human motion in acceleration space to two-dimensional images, which can be analyzed by machine vision algorithms in accordance with the techniques described herein.
Figure 4:
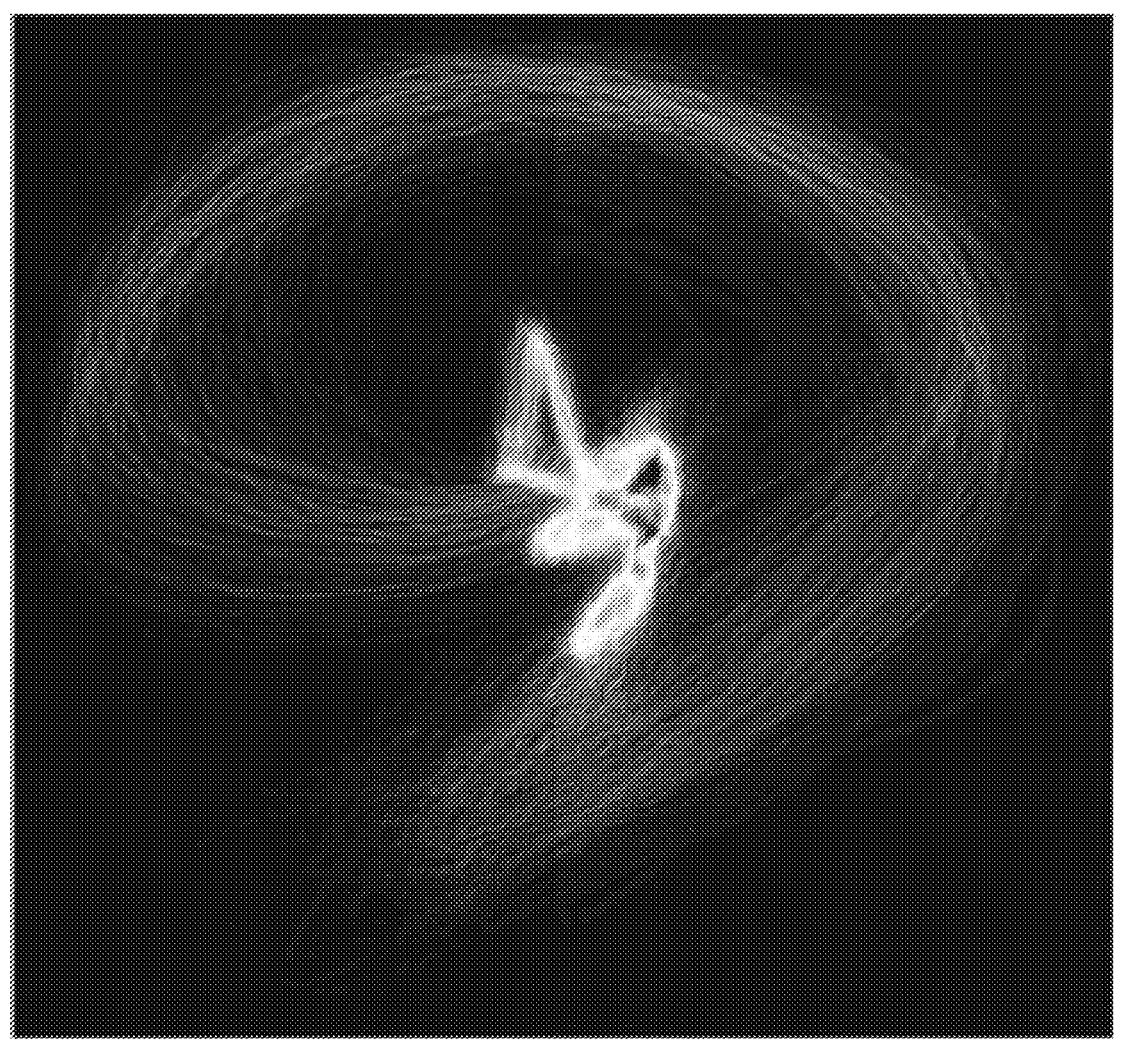
FIG. 4 depicts a resulting pattern of three-dimensional human motion in acceleration space projected to a two-dimensional still image in accordance with the techniques described herein.
Figure 5:
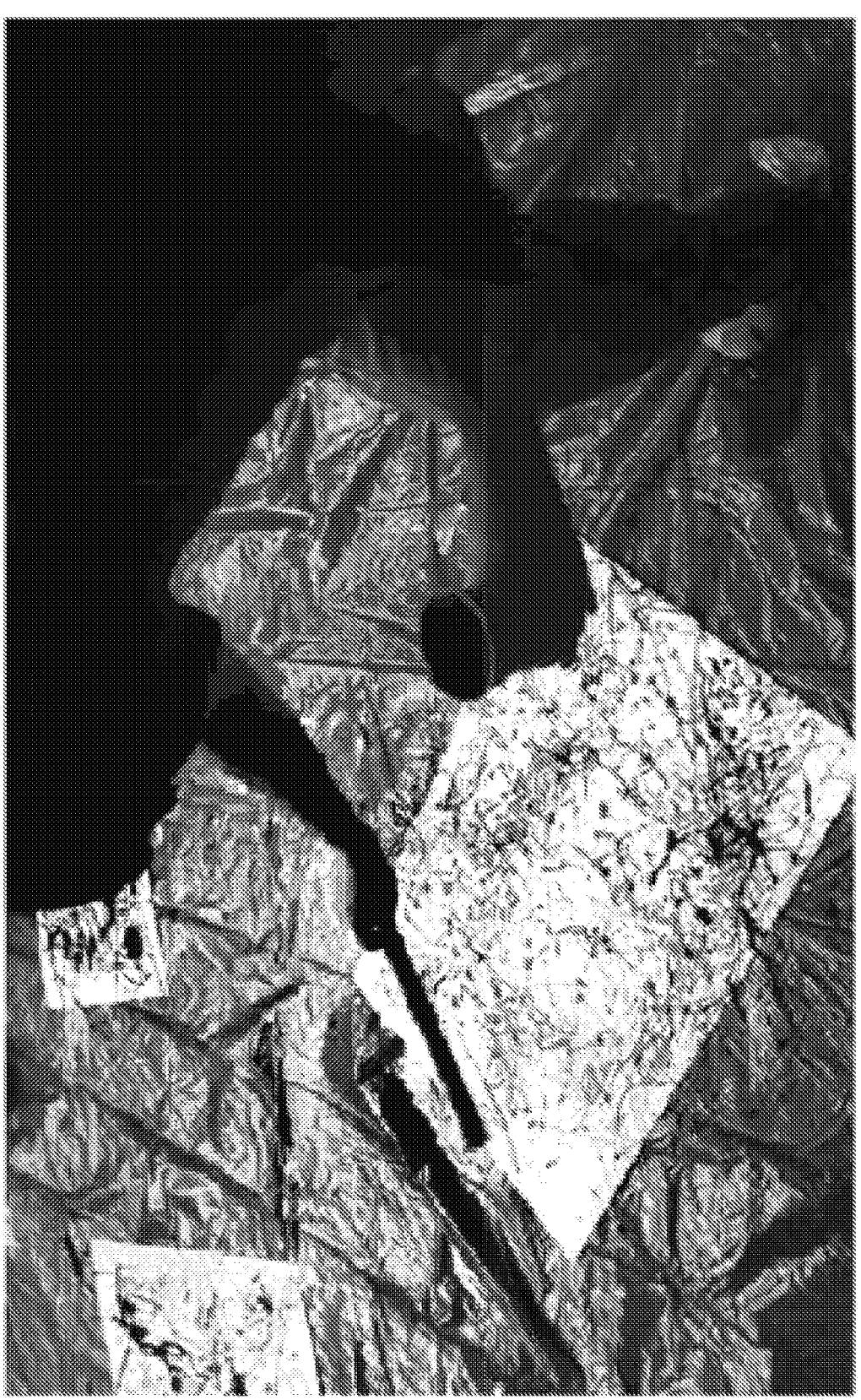
FIG. 5 depicts a two-dimensional projection of three-dimensional human motion created by dripping paint onto a canvas on the floor, such that the resulting pattern can be analyzed using machine vision and fractal analysis algorithms in order to authenticate original paintings in accordance with the techniques described herein.

Referring now to FIG. 2, in use, the system 100 (e.g., in conjunction with one or more users) may execute a method 200 for leveraging machine learning and/or fractal analysis to classify motion. It should be appreciated that the features described in reference to the method 200 may be performed in conjunction with the various methods and/or examples described herein. For example, the method 200 may be executed for authenticating artwork, determining whether a user's motion is indicative of fatigue, determining whether the user's motion is in proper form, and/or for other suitable purposes. It should be further appreciated that the particular blocks of the method 200 are illustrated by way of example, and such blocks may be combined or divided, added or removed, and/or reordered in whole or in part depending on the particular embodiment, unless stated to the contrary.

The illustrative method 200 begins with block 202 in which at least one machine learning algorithm is trained (or training of such an algorithm begins). Depending on the particular machine learning algorithm used and/or the particular embodiment, it should be appreciated that the machine learning algorithm may be supervised or unsupervised. Further, in some embodiments, the user does not need to perform any calibration of the sensors and/or the machine learning algorithm. The machine learning algorithm(s) leveraged by the system 100 may include one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms.

In some embodiments, the machine learning algorithm may be trained using a large library of movement samples collected in the lab or clinic. For example, the samples used for training may be recorded from many different individuals, some of whom may exhibit movement dysfunctions that have been diagnosed by a licensed physical therapist, while others may be from individuals possessing exemplary movement mechanics. In particular, inertial sensor data may be recorded and processed in a manner similar to that described below. As such, a database may be developed by recording the movement patterns of individuals who have been clinically assessed by a licensed physical therapist, trainer, or other professional based on the particular motion being assessed. Furthermore, many different movement patterns may be classified and samples recorded from many individuals, which collectively exhibit a range in the quality of movement mechanics. In some embodiments, samples may be recorded for a variety of movements and exercises including running, lifting weights, and other exercises where proper movement technique is critical. These patterns may then be used to train a machine learning algorithm in order to provide feedback to the user, as well as may be used by a coach or physical therapist to help diagnose movement dysfunctions in the user.

In block 204, the wearable computing system 102 records sensor data generated by the sensors 120. As discussed above, in some embodiments, the sensors 120 may include inertial sensors in some embodiments, which may be positioned on suitable positions on the user's body depending on the particular movements being assessed.

In block 206, the wearable computing system 102 projects a three-dimensional movement pattern indicated by the sensor data to one or more two-dimensional planes to generate corresponding two-dimensional projections. For example, in some embodiments, the three-dimensional movement pattern indicated by the sensor data may be projected onto multiple two-dimensional planes (e.g., a side plane, front plane, and top plane).

In block 208, the wearable computing system 102 analyzes the two-dimensional projection(s). In doing so, it should be appreciated that the wearable computing system 102 may leverage computer vision in block 212, machine learning in block 214 (e.g., the algorithms trained in block 202), and/or fractal analysis in block 216. As indicated above, in some embodiments, the two-dimensional projections, sensor data, and/or other data may be transmitted to a remote computing device in order to perform such analysis (e.g., in full or in part).

The wearable computing system 102 and/or the system 100 may apply various computer vision algorithms, filters, and/or techniques to generate processed versions of the two-dimensional projections and/or reformatted versions thereof. For example, in some embodiments, the wearable computing system 102 and/or the system 100 may utilize one or more image filters (e.g., kernel-based convolution, masking, etc.), edge detection algorithms (e.g., Canny edge detection, Sobel filters, etc.), image segmentation algorithms (e.g., pyramid segmentation, watershed segmentation, etc.), blob detection algorithms, corner detection algorithms, features identification and/or matching algorithms (e.g., scale-invariant feature transform (SIFT), speeded-up robust features (SURF), etc.), morphological image processing algorithms (e.g., erosion, dilation, opening, closing, etc.), threshold/voting algorithms, and/or other suitable algorithms useful in analyzing the two-dimensional projections.

As indicated above, the particular machine learning algorithm(s) leveraged by the wearable computing system 102 and/or the system 100 may vary depending on the particular embodiment. For example, in various embodiments, the wearable computing system 102 and/or the system 100 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms in analyzing the two-dimensional projections.

It should be appreciated that fractal analysis proceeds by dividing the pattern into successively smaller grid sizes, counting the number of squares in the grid filled at a given scale, and plotting the results on a log-log graph. Standard fractals will yield a straight line indicating scale invariance. The slope of this line is a measure of the complexity of the movement pattern. Some patterns may exhibit multi-scale deviations from a perfectly straight-line fit, and these variations may be useful in determining unique characteristics of the pattern in addition to the slope of the linear fit indicating complexity. There are several variations of fractal analysis that may be employed, including, but not limited to, spatial analysis, temporal fractal analysis, information dimension, multi-fractal analysis, and others. It should be appreciated that fractal analysis may be leveraged in conjunction with machine learning to provide a unique assessment of the movement pattern.

Unlike other techniques, the techniques described herein may use a multi-scale analysis, which takes into account variations in the fractal dimension at different scales. Further, merging machine learning with fractal analysis allows the system 100 to more completely describe the scaling properties of the bio-variation pattern being analyzed. A typical fractal analysis, by contrast, performs a linear regression on the scaling data in a log-log plot. The techniques described herein, however, may utilize machine learning to find a more complex curve to fit the scaling data, which provides a more comprehensive measurement of the subtle variations in the movement pattern.

As described in further detail throughout, it should be appreciated that the analysis of the projections may serve various purposes depending on the particular context of the analysis and/or the particular embodiment. For example, in various examples, the analysis of the projections may include authenticating artwork generated by the user based on the user's movement, determining whether the user's movement is indicative of fatigue, determining whether the user's movement corresponds with a proper movement form, and/or analyzing the projections to determine other relevant characteristics useful in providing feedback regarding the user's movement.

In block 218, the wearable computing system 102 provides feedback to the user and/or another party regarding the user's movement based on the analysis of the projection(s). As part of such feedback, or separate to such feedback, in block 220, the wearable computing system 102 generates one or more images indicative of the user's movement based on the analysis of the projection(s). In some embodiments, the image may be generated by overlaying multiple repetitions of the movement pattern and/or generating a "heat map" indicative of the user's movement. The image generated by the wearable computing system 102 may be referred to herein as a "portrait."

Although the blocks 202-220 are described in a relatively serial manner, it should be appreciated that various blocks of the method 200 may be performed in parallel in some embodiments.

Various processes and methods of classifying patterns generated by human motion in accordance with the illustrative teachings of the present disclosure are demonstrated in the following examples. These examples are illustrative only and are not intended to limit or preclude other embodiments. For instance, it should be understood and appreciated herein that the teachings of the present disclosure may also be used to classify other patterns of human motion. Additionally, in some embodiments, the technologies described herein may be used to analyze patterns of non-human animal motion (e.g., the gait/trot/gallop of a horse).

Example 1: Abstract Art Authentication

With a canvas placed on the floor, an artist may perform movements over the canvas and allow paint to drop from the brush down to the floor. This technique essentially traces the artist's three-dimensional movement patterns and projects them onto a two-dimensional plane. In this way, a unique pattern is created, which captures subtle movements of the artist. Other forms of gestural abstract art may also be assessed in accordance with such techniques method (e.g., essentially any artwork produced by large-scale motions involving full body movements). In some embodiments, fractal analysis is performed in order to quantify the complexity of the movement pattern and to determine the unique multi-scale bio-variation fractal "portrait" of the artist. Moreover, the fractal analysis may measure the degree to which the movement pattern adheres to fractal scale-invariance. The unique fractal "portrait" can then be used to distinguish artworks and individual movement patterns.

A machine learning algorithm may be trained with examples of an artist, and subsequent paintings can be classified by comparison with the original training set in order to determine the authenticity of the artwork. Machine learning may also be employed to visualize the feature space of a selection of artworks as a representation of how similar these artworks are to one another.

Example 2: Detecting Fatigue in Running

Inertial sensors may be placed on an individual such that data can be sampled as the user runs. It should be understood and appreciated herein that sensors may be placed anywhere on the body depending on what patterns are to be sampled. To this end, in some embodiments, placement on the sacrum may be particularly useful for identifying movement dysfunctions and fatigue.

A primary objective of this technique is to identify fatigue, thereby minimizing the risk of injury. To this end, it should be understood that fatigue may be exhibited in bio-variation movement patterns that are unique to each individual, and these fatigue patterns may be a major contributor to running related injuries. Because each individual exhibits fatigue in a unique way, a calibration process may be used to train the machine learning algorithm to identify fatigue for each individual. This training may involve sampling movement patterns at the beginning and ending of a "long" run (relative to the user's fitness level), then classifying these patterns with machine learning. Once the calibration has been completed, the system can take samples throughout the user's run, and in turn, provide feedback indicating fatigue level, as well as provide recommendations on when the user should rest in order to minimize risk of injury. Such a calibration process is very accurate, because it can capture nuances of movement bio-variations exhibited by one person, which may not be shared by others.

In a particular embodiment, a user may begin by placing an inertial sensor on the sacrum and going for a long run relative to the user's fitness level sufficient to induce a state of fatigue. Data samples of five strides each may be recorded throughout the run. Samples recorded near the beginning of the run are considered "non-fatigued," and samples recorded near the end of the run are considered "fatigued." In some embodiments, the inertial sensors may measure both linear acceleration, as well as angular orientation and possibly additional measurements. This higher dimensional data may be processed by first projecting to a two-dimensional space, and then joining the data-points with a line or curve in order to generate an image showing the orbital pattern of the movement over five cycles. Data samples from the beginning and end of the run may then be used to train a machine learning algorithm to classify the pattern as either fatigued or non-fatigued.

It should be appreciated that similar techniques may be applied for other movements associated with running or other exercises. For example, in some embodiments, the technologies described herein may be used to detect when an individual is sufficiently "warmed up" that they can now engage in their run or other exercises. In particular, samples recorded at the beginning of a run (or other exercise) may be considered to be in a "warm up" period. As such, data samples from the beginning and later portions of the run (or other exercise) may then be used to train a machine learning algorithm to classify the pattern as being associated with the individual being either sufficiently warmed up or insufficiently warmed up for the main run/exercises to be performed safely and/or effectively.

Fractal analysis may be performed to provide additional insight into changes in the complexity of the movement pattern due to fatigue. Once this calibration process has been completed, the user's unique fatigue "portrait" can be detected and distinguished from the non-fatigued state. The patterns may be monitored in real-time and feedback provided to the user. Patterns may also be recorded for later analysis, and may indicate the percentage of samples indicating fatigue. In addition to the machine learning analysis, aesthetic images may be generated by overlaying individual strides and incrementing the pixel value where strides overlap to create a "heat-map" type image. This image may be used by itself as visual feedback. Moreover, in some embodiments, an aesthetic orbital pattern is produced, which can then be used to guide movement and/or share with other users. This feature is particularly useful when compared to conventional systems, which rely on time series analyses that may display graphs of a measurement versus time, yet do not generate a unique view of the orbital pattern as formed by repetitive movements.

The techniques may be further expanded to include the analysis of a patient suffering from a neurodegenerative disease, such as Parkinson's disease for instance. For this application, the process proceeds in a manner similar to that described above, with the exception that the fatigued state is initially determined by a trained physical therapist or other trained medical professional in order to calibrate the machine learning system. The system may be trained to identify fatigued patterns as indicated by a trained observer, after which the patient may then exercise on his or her own and receive feedback as to when it is appropriate to rest in order to minimize the risk of injury.

Example 3: Providing Feedback for Weight-Lifting and Other Exercises

Inertial sensors may be placed on the user's body and calibrated. The calibration procedure in this example, however, may involve a coach, training partner, or physical therapist to observe the movement of the particular individual and indicate to the system if the movement pattern was performed with good form in order to train the machine learning algorithm to identify proper movement mechanics. Subsequent repetitions of the movement after calibration may then be analyzed and classified, with feedback being provided to the user. This application can be extended to include a wide variety of exercises, artistic movements, or athletic movements. Such a calibration process is very accurate, because it can capture nuances of movement bio-variations exhibited by one person, which may not be shared by others.

In some embodiments, a user being trained to deadlift a barbell may be studied. To accomplish this, sensors may be placed on the user, for instance, along the spine, and angular and linear acceleration data may be recorded in order to monitor lumbar lordosis, thoracic kyphosis, pelvic shift, and other key indicators of proper lifting form. As indicated above, a calibration process may first be performed wherein a physical therapist, coach, or training partner observes each repetition of the lift and indicates to the system if the movement was performed properly. After a sufficient number of repetitions have been performed in order to train the machine learning algorithm, the user can then exercise without the physical therapist, coach, or training partner and the system will provide feedback regarding whether or not the exercise is being performed with proper form. In this way, the user is able to exercise independently and still receive guidance. An image of the repetitive motion's orbital pattern may be generated providing visual feedback regarding the movement pattern. Fractal analysis may be performed in order to quantify the complexity of the movement pattern, and the results may then be used to assess the quality of the motion.

Other Examples

One embodiment is directed to a unique system, components, and methods for leveraging machine learning and/or fractal analysis for classifying motion. Other embodiments are directed to apparatuses, systems, devices, hardware, methods, and combinations thereof for leveraging machine learning and/or fractal analysis for classifying motion.

According to an embodiment, a method may include recording, by a wearable computing system, sensor data generated by one or more inertial sensors of the wearable computing system, projecting, by the wearable computing system, a three-dimensional movement pattern indicated by the sensor data to at least one two-dimensional plane to generate at least one two-dimensional projection, analyzing, by the wearable computing system, the at least one two-dimensional projection using at least one computer vision algorithm, and providing, by the wearable computing system, feedback to a user of the wearable computing system regarding the user's movement based on the analysis of the at least one two-dimensional projection.

In some embodiments, projecting the three-dimensional movement pattern to the at least one two-dimensional plane may include projecting the three-dimensional movement pattern to multiple two-dimensional planes to generate corresponding two-dimensional projections.

In some embodiments, the multiple two-dimensional planes may include a side plane, a front plane, and a top plane.

In some embodiments, analyzing the at least one two-dimensional projecting may include analyzing the at least one two-dimensional projection using at least one computer vision algorithm and at least one machine learning algorithm.

In some embodiments, the method may further include training the at least one machine learning algorithm, and projecting the three-dimensional movement pattern may include projecting the three-dimensional movement pattern in response to training the at least one machine learning algorithm.

In some embodiments, providing feedback to the user regarding the user's movement may include generating an image indicative of the user's movement based on the at least one two-dimensional projection.

In some embodiments, generating the image may include generating a heat map indicative of the user's movement.

In some embodiments, analyzing the at least one two-dimensional projection may include authenticating artwork generated by the user based on the user's movement.

In some embodiments, analyzing the at least one two-dimensional projection may include determining whether the user's movement is indicative of fatigue.

In some embodiments, analyzing the at least one two-dimensional projection may include determining whether the user's movement corresponds with a proper movement form.

In some embodiments, analyzing the at least one two-dimensional projection may include transmitting the at least one two-dimensional projection to a remote computing device for analysis.

According to another embodiment, a system may include at least one inertial sensor and a wearable computing device comprising at least one processor and at least one memory having a plurality of instructions stored thereon that, in response to execution by the at least one processor, causes the wearable computing device to receive sensor data generated by the at least one sensor of the wearable computing device, project a three-dimensional movement pattern indicated by the sensor data to at least one two-dimensional plane to generate at least one two-dimensional projection, analyze the at least one two-dimensional projection using at least one computer vision algorithm, and provide feedback to a user of the wearable computing device regarding the user's movement based on the analysis of the at least one two-dimensional projection.

In some embodiments, to analyze the at least one two-dimensional projecting may include to analyze the at least one two-dimensional projection using at least one computer vision algorithm and at least one machine learning algorithm.

In some embodiments, to provide feedback to the user regarding the user's movement may include to generate an image indicative of the user's movement based on the at least one two-dimensional projection.

In some embodiments, to analyze the at least one two-dimensional projection may include to authenticate artwork generated by the user based on the user's movement.

In some embodiments, to analyze the at least one two-dimensional projection may include to determine whether the user's movement is indicative of fatigue.

In some embodiments, to analyze the at least one two-dimensional projection may include to determine whether the user's movement corresponds with a proper movement form.

According to yet another embodiment, a wearable computing system may include at least one processor and at least one memory having a plurality of instructions stored thereon that, in response to execution by the at least one processor, causes the wearable computing system to receive sensor data generated by at least one inertial sensor worn by a user, project a three-dimensional movement pattern indicated by the sensor data to at least one two-dimensional plane to generate at least one two-dimensional projection, analyze the at least one two-dimensional projection using at least one computer vision algorithm, and provide feedback regarding the user's movement based on the analysis of the at least one two-dimensional projection.

In some embodiments, to analyze the at least one two-dimensional projecting may include to analyze the at least one two-dimensional projection using at least one computer vision algorithm and at least one machine learning algorithm.

In some embodiments, to provide feedback regarding the user's movement may include to generate an image indicative of the user's movement based on the at least one two-dimensional projection.

Force Portraits to Identify Phases Example

In further embodiments, there is provided a method to detect and display phases of two or more orbital cycles, here identified as orbital patterns or force portraits. As used herein, a complete orbital cycle starts and stops at the same position of a user's body performing a repetitive motion. When considering an individual while running, a complete orbital cycle may start and stop at an identified position of a runner's body which repeats its position while running. For instance, as a person runs the orbital cycle may begin with initial contact of the left foot with the ground and the orbital cycle is completed once the same foot touches the ground a second time. Such orbital cycles include, but are not limited to a single cycle of the individual while running, walking, or other repetitive motion.

In one embodiment, monitoring the one or more orbital cycles includes the use of inertial sensors placed on the sacrum of an individual. The inertial sensors generate acceleration signals in one or more dimensions, wherein each orbital cycle is identified or captured in an acceleration space that represents the individual's orbital cycles. While a single orbital cycle may be used to identify an individual's body position during movement over the course of a single orbital cycle, more than two orbital cycles may be used to provide a force portrait. The force portrait is used to more particularly identify an individual's body position over a period of time.

Identifying and capturing multiple orbital cycles over a period of time may more accurately identify body movements or body movement positions during longer periods of repetitive movements, such as during an individual's run. In one embodiment, five (5) or more orbital cycles are captured for the individual to identify body movements and to generate a force portrait. The use of multiple orbital cycles over a period of time allows for a more accurate identification of body movements and body movement positions, since body movements or body movement positions from one orbital cycle to the next may not be identical. In other embodiments, 25 orbital cycles are identified and captured to determine an individual's body movement and the resulting force portrait.

FIGS. 6, 7, 8, and 9 illustrate different phases of one or more orbital cycles for a runner. The orbital cycles of a runner are also called "gait" cycles, as used herein. Orbital cycles for walkers may also be called gait cycles. While gait cycles for runners are described with respect to FIGS. 6, 7, 8, and 9, the present disclosure is not limited to runners, and other orbital cycles for repetitive body movements are contemplated.

Because a runner's gait is not the same from one gait cycle to the next, each captured gait cycle, when overlaid with other gait cycles along an x-y axis, generates the orbital patterns or force portraits, as illustrated in FIGS. 6-9. Individual gait cycles which are adjacently located, but not always located directly on one another, are captured and displayed as the force portrait on a user interface or display of a mobile device. The mobile device includes but is not limited to cellular phones, smart phones, and smart watches. As the individual runs, multiple gait cycles are captured by the inertial sensors over a period of time. The captured multiple gait cycles are displayed graphically along an x-y axis, where the x axis, ax, is in meters per second squared, and the y axis, ay, is in meters per second squared.

An orbital pattern of multiple orbital cycles, i.e., the force portrait, identifies specific phases of an individual's gait while running which include, but which are not limited to, landing, stabilizing, launching, and flying. As seen in FIG. 6, multiple gait cycles are overlaid to provide a force portrait 230 representative of a running condition of a runner 232. A landing phase 234 of the force portrait 230 is identified and located between lines L1 and L2. In the landing phase 234, the runner 232 lands on a left foot during a run, with the sensors indicating that there is a decrease in forward motion, i.e. a deceleration, as shown by the negative values of acceleration along the x and y axis. The deceleration is generally directed along the line 236. In this example, the landing phase 234 is indicated by lines having a grayscale different than the grayscales of the other phases in FIGS. 7, 8, and 9. While grayscale patterns are shown, other embodiments include patterns having color, wherein a different color is used for different phases. For instance, the landing phase may be red, the stabilizing phase may be yellow, the launching phase may be green, and the flying phase may be blue. Different colors for different phases are particularly useful for display on electronic devices having color displays.

Specific points within the orbital pattern may also be detected and labeled, such as initial contact, toe-off, peak braking, maximum stabilizing, and also the transition points between phases. The phase may also be represented by a portion of the force portrait on the left or right side of the x axis. In some embodiments, the location of body parts may be identified with the orbital pattern, such as a person's heel when landing or person's toe when launching. Each of the different conditions of a user's repetitive motion may be identified by one or more indicators. In this embodiment, for instance, the indicator is a color value, a grayscale value, or a combination of a color value and a grayscale value.

Consequently, orbital patterns as described herein may be analyzed to determine a person's transition from one movement to the next, landing to stabilizing for instance, as well as body position, for instance straight or leaning, and body part location, for instance heel location or toe location during a movement. Orbital patterns may also identify consistency of movement from one gait cycle to the next gait cycle.

Once the runner 232 has landed on the left foot, the runner's foot stabilizes the running motion in preparation for continuing the run. As seen in FIG. 7, a stabilizing phase 238 is indicated by a segment of the pattern between lines S1 and S2. This phase 238 is shown by positive values of acceleration along the x and y axis, each of which increase along the direction of arrow 240.

Figures 8, 9:
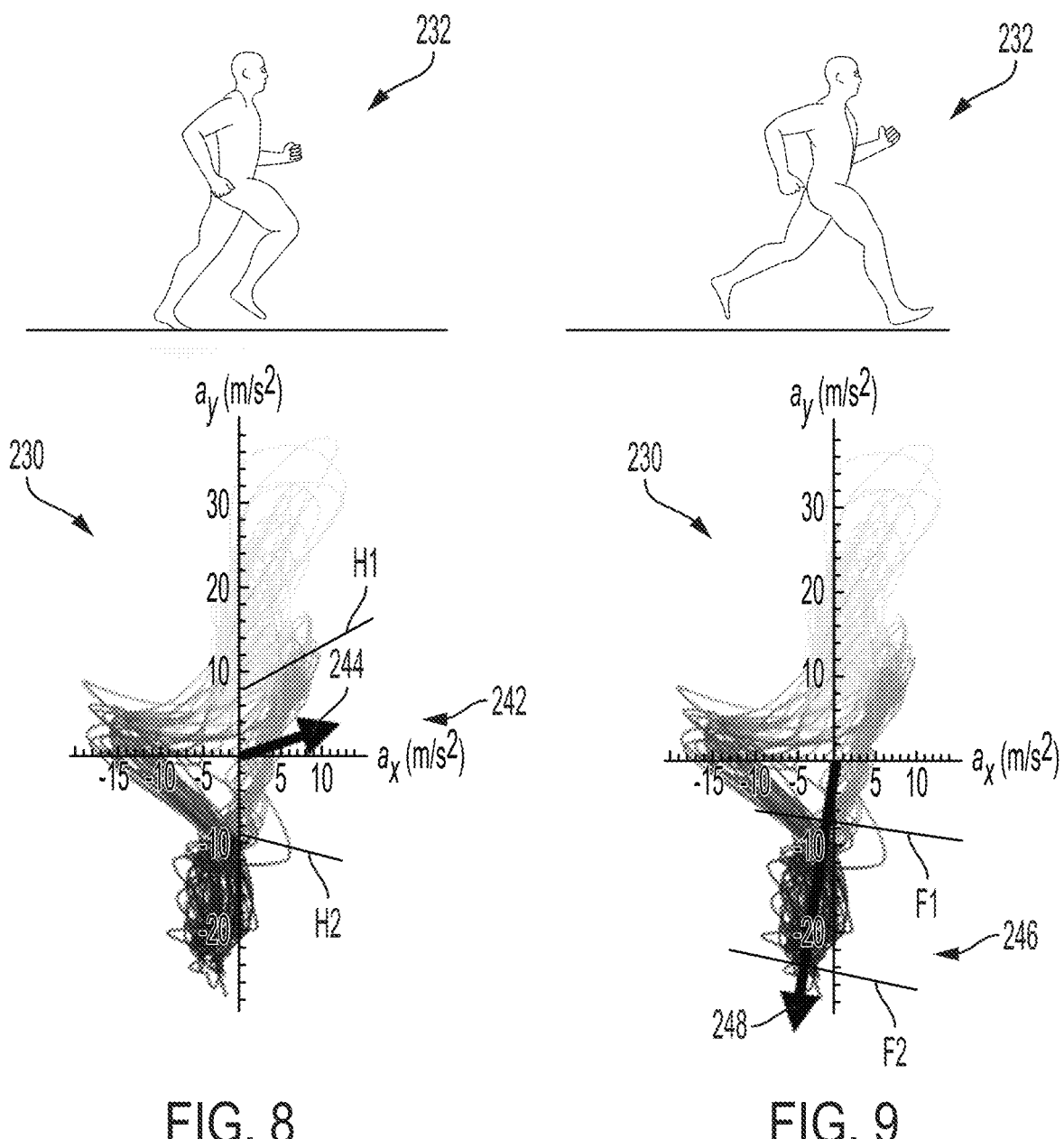
FIG. 8 depicts a plurality of orbital cycles of a runner including a third phase.
FIG. 9 depicts a plurality of orbital cycles of a runner including a fourth phase.

Once stabilized, the runner 232 launches towards the next step along a running direction as seen in FIG. 8. A launching phase 242 is indicated by a segment of the pattern between lines H1 and H2. The launching phase 242 is typically in a forward direction and includes acceleration components along the positive y axis and along both the positive and negative x axis. This forward direction indicated a general increase in acceleration along an arrow 244.

After the launching phase 242, the runner enters a flying phase 246, identified between lines F1 and F2. During the flying phase 246, the runner 232 enters a phase in which deceleration occurs along both the x and y axis. The general direction of the deceleration is illustrated along the arrow 248.

Each of the phases for the force portrait having multiple orbital cycles are identified by the use of machine learning. Machine learning is used to identity running movement functions including a proper function and/or a dysfunctions, which may include related injuries. Identification of running movement dysfunctions is achieved by utilizing the results of biomechanical research and/or a three dimensional (3D) motion capture system. When using the 3D motion capture system, biomechanical features of one or more individuals are measured. The measured 3D motion of the individual is synchronized with the described sensor. Machine learning is then applied to the force portrait to correlate the accelerometer patterns recorded by the sensor with the measured 3D motion. In one embodiment, a machine learning algorithm, located on the mobile device, is applied to the multiple orbital cycles to determine patterns that describe movement dysfunctions.

Movement dysfunction may be identified with the use of 3D motion capture which is measured based on angular movement of a person, and in particular measurement of a body's joint angles, orientation angles, and attitude of body segments. For instance, body angles may include anterior/posterior pelvic tilt, lateral pelvic drop, hip extension angle, knee angles (valgus/varus, max flexion). These are direct measurements from 3D motion capture. Machine learning as described herein, is used to correlate patterns measured by the accelerometer with patterns measured by 3D motion capture. With the use of machine learning, force portraits that correspond to particular movement patterns that have been measured with motion capture are identified.

Machine learning is used to identify dysfunctions in orbital patterns (i.e. the force portraits). The 3D motion capture data is a direct measurement, and this may be used to train the machine learning model to identify patterns in the sensor data. In one implementation, the user's phone performs machine learning analysis and identifies dysfunctions for the user. In other implementations, this analysis may be performed on the sensor itself, with force portrait results that may be transmitted to the phone or cloud database. In a further implementation, a more in-depth analysis could also be performed on a server at a remote location. In an exemplary implementation, only one primary machine learning analysis may be performed; using data from the sacrum sensor to identify movement dysfunctions.

Pathological movement dysfunctions may be detected by the analysis of acceleration data collected from the sensor placed at the sacrum of the user. Detected running dysfunctions may include poor hip mobility, poor hip strength, excessive anterior pelvic tilt, excessive pelvic rotation, excessive lateral pelvic drop, excessive knee valgus, insufficient knee flexion, foot crossover, and others. Detected walking dysfunctions may include antalgic gait, propulsive gait, scissors gait, spastic gait, steppage gait, ataxic gait, and others. Deviations from normal movement patterns may be identified, even if the specific cause is not determined. In some implementations, one or more dysfunctions are visible in the force portrait. The machine learning models identify the force portraits that correspond to particular movement dysfunctions.

In this way, a runner who uses the inertial sensor system to record a run may identify specific movement dysfunctions which are shown by the gait patterns. The force portrait includes identifiable patterns associated with specific movement dysfunctions. Once the dysfunctions have been identified, a clinician identifies dysfunctions from the orbital patterns, i.e. the force portraits, and identifies solutions to remedy the movement dysfunctions. Once identified, the clinician may provide suggestions on actions a runner can take to reduce or alleviate the identified dysfunctions that are likely to lead to injury. In other embodiments, the force portraits include indicators that direct an individual to a possible location of a dysfunction and one or more suggested remedies to improve the dysfunction.

Average Force Portrait Example

Figures 10A, 10B, 10C:
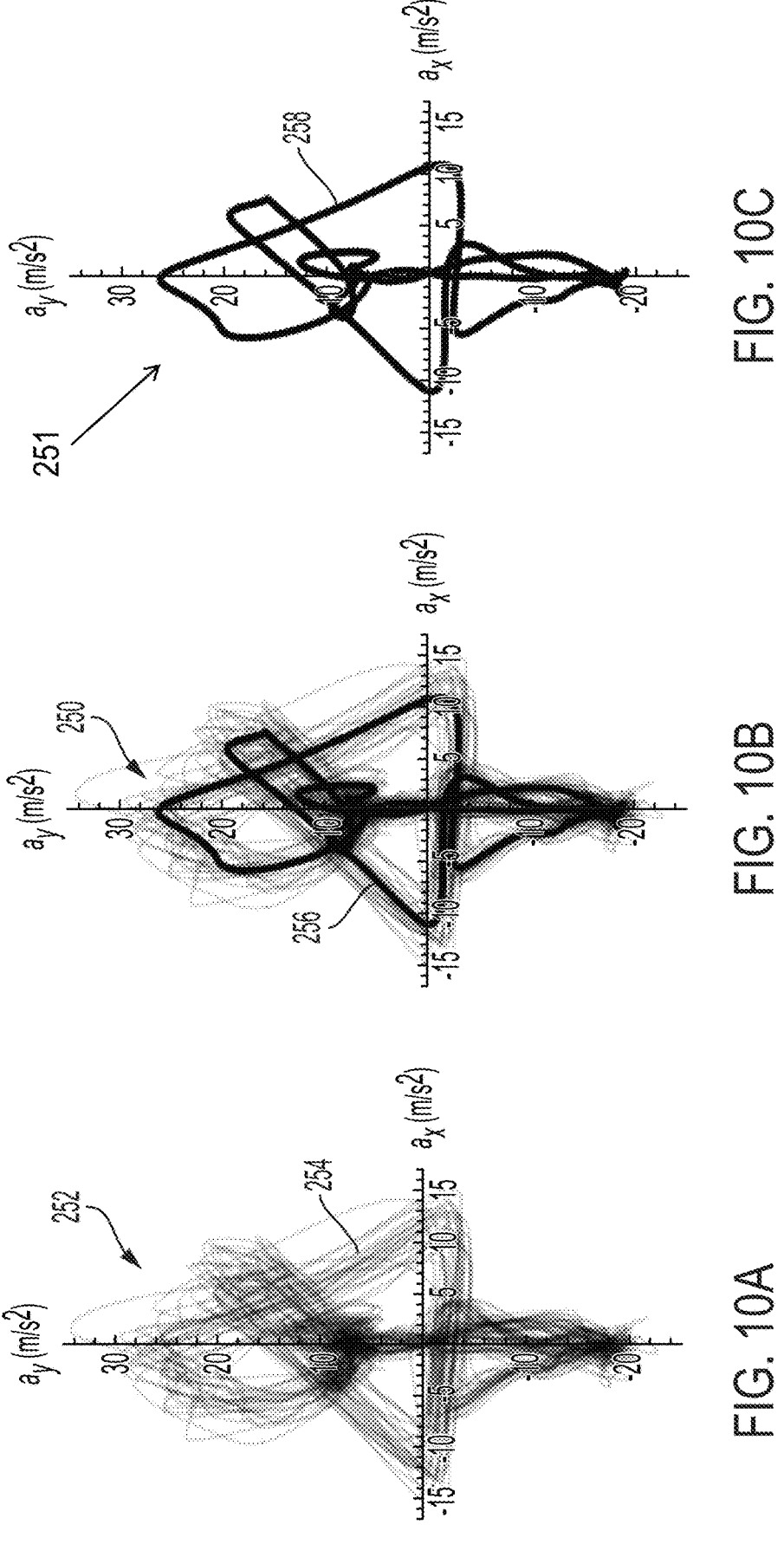
FIG. 10A-10C depict a plurality of movement orbital cycles of an individual to arrive at an average of the plurality of the movements.

In a further embodiment, there is provided a method for generating an average force portrait as shown in FIGS. 10A-10C. An average force portrait 250 overlaid on the plurality of orbital cycles, illustrated in FIG. 10B, is generated based on a plurality of orbital cycles 252, shown in FIG. 10A. Each of the plurality of orbital cycles 252 are generated as described herein. FIG. 10C illustrates an average force portrait 251. For a runner, each of the orbital cycles, is a gait cycle illustrating one complete gait cycle. In one embodiment, a plurality of gait cycles, such as twenty or more gait cycles, are overlaid to provide an initial orbital pattern or force portrait 254. FIGS. 10A-10C illustrate force portraits from a rear view such that portions of the multiple gait cycles on the left side of the x axis identify accelerations in the direction of the left side of a runner from a rear view. Portions of the multiple gait cycles on the right side of the x axis identify accelerations in the direction of the right side of the runner from the same rear view.

Since the gait cycles are not consistent from one gait cycle to the next gait cycle, an average of each of the gait cycles is determined as identified in FIG. 10B. The result of the average provides a single "average" force portrait. Instead of displaying curves of multiple gait cycles as one image, such as illustrated in FIGS. 6-9, a single curve 256 is calculated which represents the average of many individual gait cycles. As illustrated in FIG. 10B, the average gait cycle 256 is displayed with the multiple gait cycles. In other embodiments, the average gait cycle 256 is displayed by itself. The average force portrait 250 may be a simple curve, such as the single curve 256 of FIG. 10B, which is provided as a single shade of gray or as a single color. In another embodiment, a variable curve 258 is displayed as seen in FIG. 10C. In this embodiment, the variable curve 258 includes portions of the curve that identify a variability of the original cycles from which the average curve was calculated and generated. In this embodiment, an indicator to identify the average includes single solid line having a width. The single solid line may include a color value, a grayscale value, or a color value and a grayscale value.

While a color value may provide useful information to a user, the shape of the average force portrait may indicate that a plurality of cycles have been consolidated into a single average curve. After the average curve has been generated, the average curve may be colorized based on any of the other methods described herein for regular force portraits. For instance, a particular color may be selected to identify the phase of the gait cycle. In one implementation, the color may be derived by averaging the color of the original multiple cycles.

Alternative Aesthetic Force Portrait Example

Figure 11B:
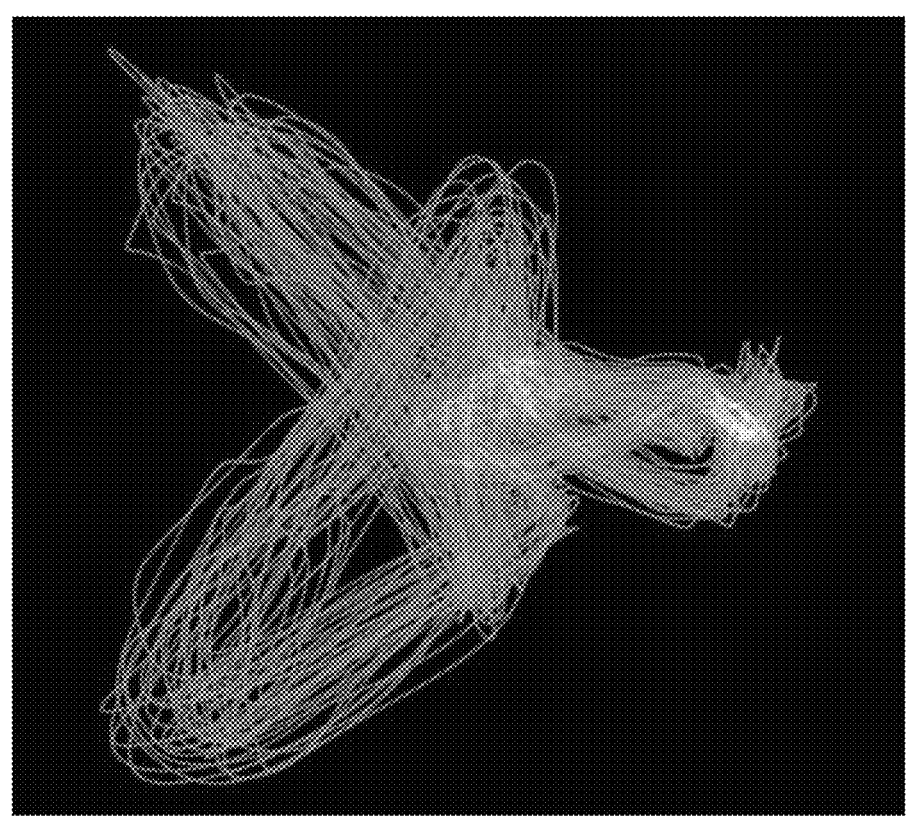
FIGS. 11A and 11B depict a plurality of movement orbital cycles of an individual to an overlap of a plurality of the orbital cycles.
Figure 11A:
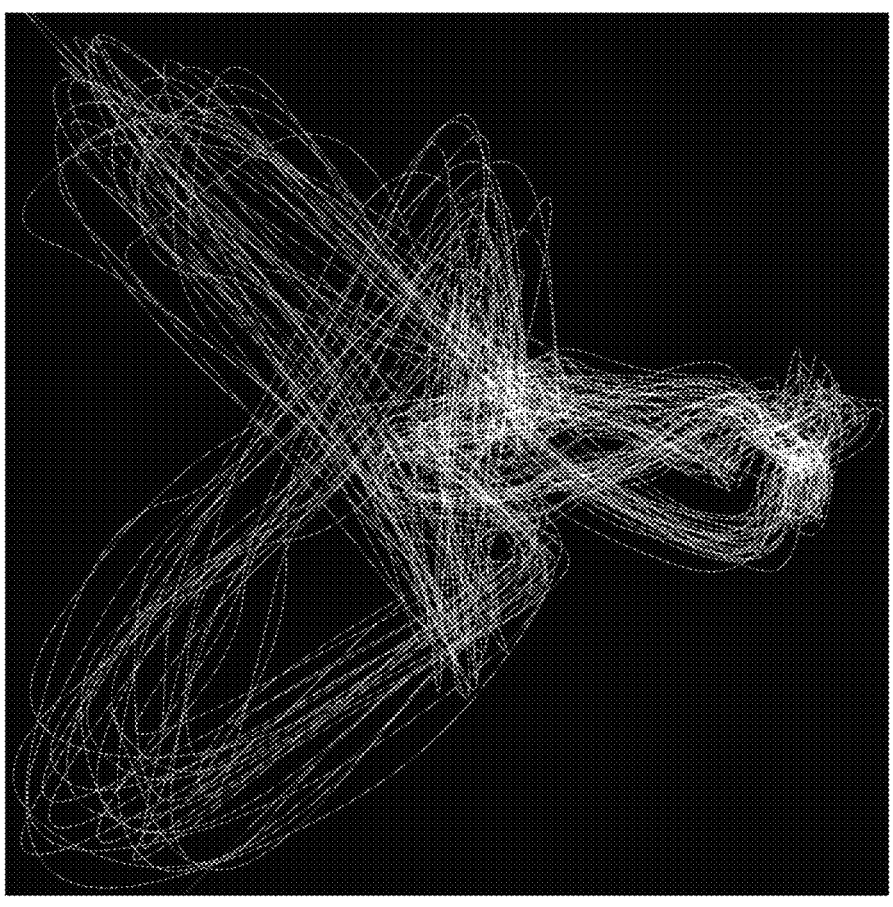

In another embodiment, the force portrait is displayed on a user interface of a mobile device. The force portrait includes a color value that is incremented when any one orbital cycle overlaps itself or another orbital cycle. In this embodiment, one or both of the hue or saturation level of the color pixels is adjusted every time any part of one orbital cycle overlaps with itself or with another orbital cycle, regardless of whether it is the same cycle or a different cycle. FIG. 11A illustrates a plurality of orbital cycles, some of which overlap with other orbital cycles. In this illustration, however, the occurrence of overlapping of orbital cycles is not shown. In FIG. 11B, overlap condition of overlapping orbital cycles is identified and the color value or gray value is changed based on the overlap. In some embodiments, the overlapping of orbital cycles occurs only at certain portions of the orbital cycles. In this case, only the portions of orbital cycles that overlap are highlighted by adjusting the color value of color pixels or a grayscale value of a monochrome image. When illustrated in grayscale, the overlapping is indicated by a change to the brightness or luminosity values. In this embodiment, for instance, the indicator is a color value based on hue or saturation, a grayscale value based on brightness or luminosity values, or both.

Overlapping orbital cycles may be used to indicate moments in the gait cycle, where the force vector is the same within the view plane. That is, if the 3D force vector is x,y,z but the view plane is x,y, then when x,y is the same between two or more cycles, then the orbital cycle overlaps. While this may not directly identify movement dysfunctions, it is an indicator of how consistent or variable the gait cycle is. It may also indicate regions of the force portrait that tend to frequently have a similar force vector.

Visualizing Symmetry of Force Portrait Example

In a further embodiment, there is provided a method to visualize symmetries of an individual's left side versus the right side when performing repetitive motion. Acceleration data is collected using the inertial sensor. Once collected, the left side and the right sides are identified. The identified left side in each of the x, y, and z acceleration axis is compared to the identified right side for each x, y, z acceleration axis is compared. Once compared, a difference value is computed and identified. A force portrait is then generated with a color corresponding to the degree of asymmetry. Each x, y, z axis may be assigned its own color, or a composite may be determined by calculating total asymmetry in all dimensions. In one alternative, grayscale values may be assigned for each x, y, and z axis. In this embodiment, for instance, the indicator is a color, a grayscale value, or a combination of color and grayscale, which are used to identify difference between left side versus right side.

The symmetry force portrait provides a method for visualizing asymmetries that may be present in the forces that a runner experiences throughout their gait. Brighter parts of the symmetry force portrait indicate a higher level of asymmetry in the forces that a runner experiences while on their left or right leg. The level of asymmetry is measured by finding the difference in the forces experienced throughout a left and right step. Visualizing force portraits this way makes it easier to identify specifically which parts of a runner's gait suffer from asymmetry. Some examples of movement dysfunctions that may be identified with symmetry force portraits include: asymmetric braking/stabilizing (i.e. landing harder on one leg than the other) or asymmetric propulsion (i.e. pushing harder with one leg than the other). In one example, the coloring scheme for the symmetry force portrait shown in the figure is obtained by averaging the asymmetry of the two axes (x and y directions).

Asymmetry Example

Figure 12:
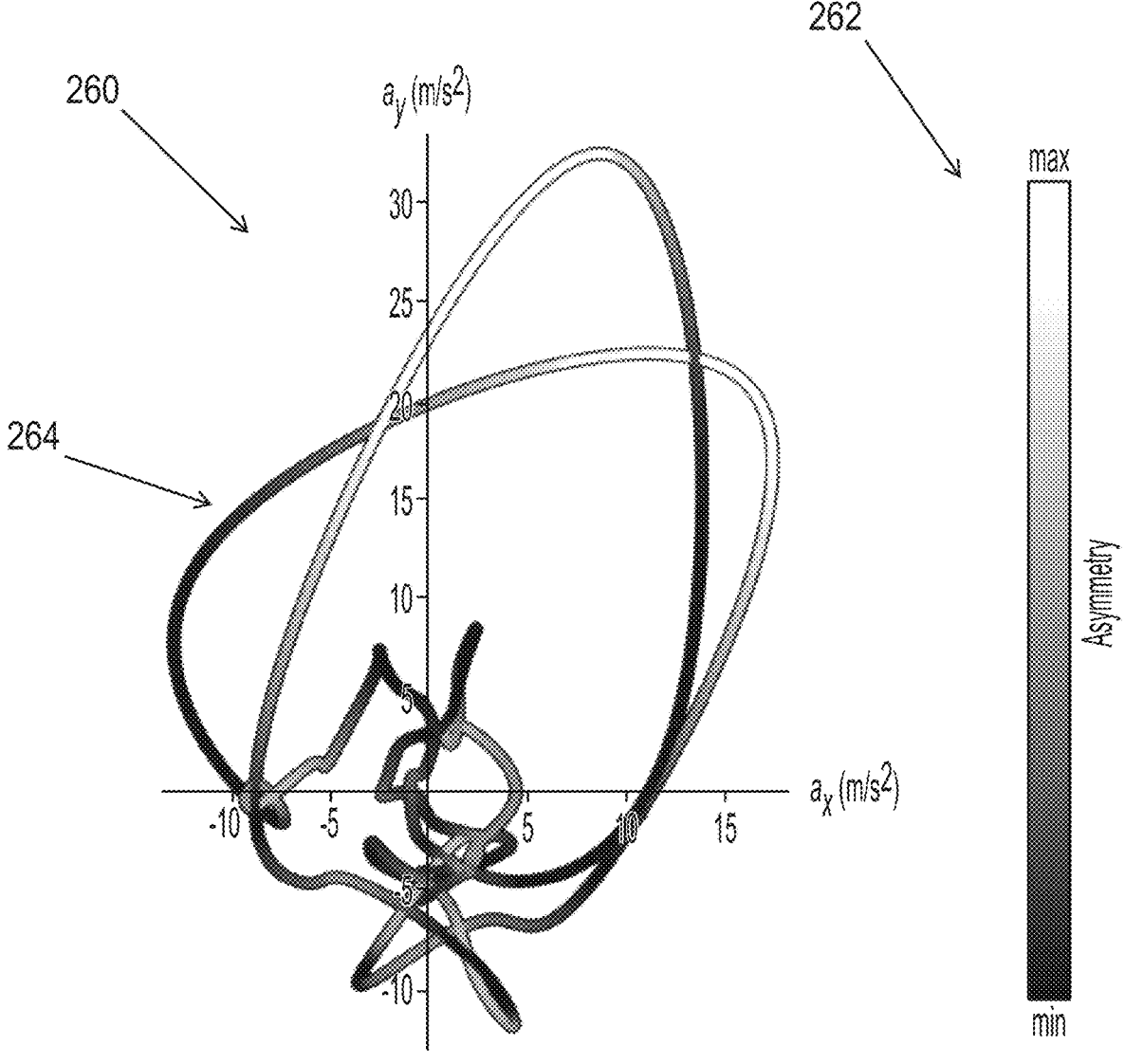
FIG. 12 depicts an orbital image depicting asymmetry of an individual during movement.

FIG. 12 illustrates a force portrait 260 generated to show asymmetry of an individual about an x axis, $a_x$, and a y axis, $a_y$. A sliding scale 262 shown adjacent to the force portrait 260 identifies the asymmetry of the force portrait 260 using grayscale values. For instance, minimum asymmetry (maximum symmetry) is shown in a darkest shade or gray. Maximum asymmetry (minimum symmetry) is shown in a lightest shade of gray. The asymmetry of the force portrait 260, therefore, is shown by the values of grayscale that appear in the orbital cycle 264.

Estimating Fractal Dimension Using Machine Learning Example

Standard fractal analysis techniques may be extremely computationally intensive, making it difficult to make fractal analysis computations on currently known mobile devices, such as a cell phone, a smart phone, or a smart watch. To overcome this disadvantage, a computer having a greater computing power than what is provided by the mobile device is used to calculate the fractal dimensions of a large number of force portraits. The resulting fractal dimensions are subsequently used to train a machine learning model. The trained machine learning model is then used to estimate the fractal dimension of the force portrait much more efficiently when compared to a standard computational approach. The estimated fractal dimension is estimated on a phone or smart watch with minimal power consumption.

The fractal dimension is a measure of the complexity of a pattern. It is, however, a computationally intensive process to measure directly. In one implementation, a true measurement on "a large number" of force portraits is made, and then the results of this process are used to train a machine learning model. The fractal dimension may now be estimated by machine learning, which is a much less computationally intensive process. "A large number" may include hundreds or possibly thousands of force portraits. These force portraits may then be obtained from many different individuals. All force portraits involved in this process may be generated from inertial sensors, which reduces or eliminates the need for 3D motion capture or other systems. Calculating the fractal dimension and training the machine learning model happens on a powerful computer, but the resulting machine learning model may run on a phone. It is intended that an application running on a phone may estimate the fractal dimension of each force portrait recorded by a user. This process may also take place on a remote server to allow a user to access their information through a web-based portal. The force portrait displayed on the phone may be the same as what is recorded by the user, the fractal dimension is an additional metric to assess the quality of the movement pattern visualized by the force portrait. For instance a fractal dimension "D" of 1.3 may indicate a healthy pattern, while D of 1.8 may be pathological.

While exemplary implementations incorporating the principles of the present disclosure have been described hereinabove, the present disclosure is not limited to the described implementations. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method, comprising:
sensing sensor data generated by one or more inertial sensors, the sensor data being caused by movement of a user, and the sensor data comprising acceleration data in multiple dimensions;
recording the sensor data with a wearable computing system configured to be worn by the user;
projecting, by the wearable computing system, a three-dimensional acceleration pattern indicated by the acceleration data to a two-dimensional plane to generate a two-dimensional acceleration projection having a first acceleration dimension and a second acceleration dimension, where the first acceleration dimension is orthogonal to the second acceleration dimension and both the first and second acceleration dimensions have units corresponding to distance per time squared;

analyzing the two-dimensional acceleration projection using machine learning to identify a movement function, including a proper movement or a movement dysfunction; and providing to the user, by the wearable computing system, visual feedback regarding the user movement based on the analyzed two-dimensional acceleration projection;

wherein the visual feedback comprises a two-dimensional orbital image showing an orbital pattern having one or more indicators;

wherein the two-dimensional orbital image includes a plurality of orbital cycles and the user movement comprises a plurality of repetitive user movement cycles, each orbital cycle of the plurality of orbital cycles representing an individual movement cycle of the plurality of repetitive user movement cycles;

wherein each orbital cycle represents a repetitive body motion of a user having a start location and stop location of the user's body;

wherein the indicators of the orbital pattern identify one or more phases of the orbital pattern of the user in the first and second acceleration dimensions, wherein the phases are identified based on a plurality of orbital cycles.

2. The method of claim 1 wherein the indicators of the orbital pattern include one or more phases of a landing phase, a stabilizing phase, a launching phase, or a flying phase.

3. The method of claim 2 wherein the one or more phases each include different indicators to identify a different phase of the one or more phases.

4. The method of claim 3 wherein the different indicators include one of a plurality of colors, or one of a plurality of grayscales, or a combination thereof.

5. The method of claim 1 wherein the two-dimensional projection includes a plurality of orbital cycles and the analyzing of the two-dimensional acceleration projection includes determining an overlap condition of the plurality of orbital cycles.

6. The method of claim 5 wherein the one or more indicators of the two-dimensional orbital image showing the orbital pattern includes a color value or a grayscale value that is incremented when any orbital cycle overlaps.

7. A method, comprising:

sensing sensor data generated by one or more inertial sensors, the sensor data being caused by movement of a user, and the sensor data comprising acceleration data in multiple dimensions;

recording the sensor data with a wearable computing system configured to be worn by the user;

projecting, by the wearable computing system, a three-dimensional acceleration pattern indicated by the acceleration data to a two-dimensional plane to generate a two-dimensional acceleration projection having a first acceleration dimension and a second acceleration dimension, where the first acceleration dimension is orthogonal to the second acceleration dimension and both the first and second acceleration dimensions have units corresponding to distance per time squared;

analyzing the two-dimensional acceleration projection using machine learning to identify a movement function, including a proper movement or a movement dysfunction; and providing to the user, by the wearable computing system, visual feedback regarding the user movement based on the analyzed two-dimensional acceleration projection;

wherein the visual feedback comprises a two-dimensional orbital image showing an orbital pattern having one or more indicators;

wherein the two-dimensional projection includes a plurality of orbital cycles and the analyzing of the two-dimensional acceleration projection includes determining an average of the plurality of orbital cycles;

wherein the two-dimensional orbital image includes a single curve representing an average of the plurality of orbital cycles;

wherein the single curve includes a different indicator to identify each one of one or more phases of the single curve, wherein the phases include at least one of a landing phase, a stabilizing phase, a launching phase, or a flying phase.

8. A method, comprising:

sensing sensor data generated by one or more inertial sensors, the sensor data being caused by movement of a user, and the sensor data comprising acceleration data in multiple dimensions;

recording the sensor data with a wearable computing system configured to be worn by the user;

projecting, by the wearable computing system, a three-dimensional acceleration pattern indicated by the acceleration data to a two-dimensional plane to generate a two-dimensional acceleration projection having a first acceleration dimension and a second acceleration dimension, where the first acceleration dimension is orthogonal to the second acceleration dimension and both the first and second acceleration dimensions have units corresponding to distance per time squared;

analyzing the two-dimensional acceleration projection using machine learning to identify a movement function, including a proper movement or a movement dysfunction; and providing to the user, by the wearable computing system, visual feedback regarding the user movement based on the analyzed two-dimensional acceleration projection;

wherein the visual feedback comprises a two-dimensional orbital image showing an orbital pattern having one or more indicators;

wherein the two-dimensional projection includes a plurality of orbital cycles and the analyzing the two-dimensional acceleration projection includes determining a user's left side versus right side;

wherein the one or more indicators of the two-dimensional orbital image showing the orbital pattern includes a first color value or a first grayscale value showing the left side and a second color value or a second grayscale value showing the right side.

9. A wearable computing device configured to be worn by a user, the wearable computing device comprising:

one or more inertial sensors configured to generate sensor data based on movement of the user, the sensor data comprising acceleration data in multiple dimensions;

at least one processor configured to:

receive the sensor data generated by the one or more inertial sensors;

project a three-dimensional acceleration pattern indicated by the acceleration data to a two-dimensional plane to generate a two-dimensional acceleration projection that has a first acceleration dimension and a second acceleration dimension, where the first acceleration dimension is orthogonal to the second acceleration dimension and both the first and second acceleration dimensions have units of corresponding to distance per time squared;

analyzing the two-dimensional acceleration projection using machine learning to identify a movement function, including a proper movement or a movement dysfunction;

provide visual feedback of the user movement based on the analyzed two-dimensional acceleration projection;

wherein the visual feedback comprises a two-dimensional orbital image showing an orbital pattern having one or more indicators;

wherein the two-dimensional orbital image includes a plurality of orbital cycles and the user movement comprises a plurality of repetitive user movement cycles; wherein each orbital cycle of the plurality of orbital cycles represents an individual movement cycle of the plurality of repetitive user movement cycles;

wherein each orbital cycle represents a repetitive body motion of a user having a start location and stop location of the user's body;

wherein the indicators of the orbital pattern identify one or more phases of the orbital pattern of the user in the first and second acceleration dimensions.

10. The wearable computing device of claim 9, further comprising a transmitter configured to transmit the at least one two-dimensional acceleration projection to a remote computing device for analysis.

* * * * *